United States Patent [19]

Suzuki et al.

[11] 4,426,975
[45] Jan. 24, 1984

[54] IGNITION TIMING CONTROL SYSTEM FOR INTERNAL COMBUSTION ENGINES

[75] Inventors: Shosuke Suzuki; Teruyoshi Ito, both of Kariya; Yukio Sakakibara, Aichi; Takashi Yamada, Nishio; Fumiyoshi Kubo, Kawasaki; Kunimasa Yoshimura, Mishima; Mitsuyuki Ugajin, Toyota; Kiyokane Kaji, Toyota; Mitsuyuki Banno, Toyota, all of Japan

[73] Assignees: Nippondenso Co., Ltd., Kariya; Toyota Jidosha Kogyo Kabushiki Kaisha, Toyota, both of Japan

[21] Appl. No.: 322,693

[22] Filed: Nov. 18, 1981

[30] Foreign Application Priority Data

Nov. 26, 1980 [JP] Japan .................. 55-169115[U]

[51] Int. Cl.³ ........................................ F02P 5/14
[52] U.S. Cl. .................................... 123/425; 123/418; 123/427
[58] Field of Search ............... 123/425, 415, 416, 418, 123/419, 427

[56] References Cited

U.S. PATENT DOCUMENTS

| | | | |
|---|---|---|---|
| 4,276,861 | 7/1981 | Kearney et al. | 123/425 |
| 4,329,970 | 5/1982 | Mowery | 123/425 |
| 4,351,281 | 9/1982 | Geiger et al. | 123/425 |

Primary Examiner—Andrew M. Dolinar
Attorney, Agent, or Firm—Cushman, Darby & Cushman

[57] ABSTRACT

In response to the occurrence of knocking in an internal combustion engine, the basic ignition timing is corrected in a direction to retard it through the charging and discharging of an integrator circuit. The integrated current output of the integrator circuit is varied in accordance with a voltage corresponding to the speed of the engine so as to limit the maximum amount of ignition timing retard at low speeds or high speeds of the engine.

4 Claims, 8 Drawing Figures

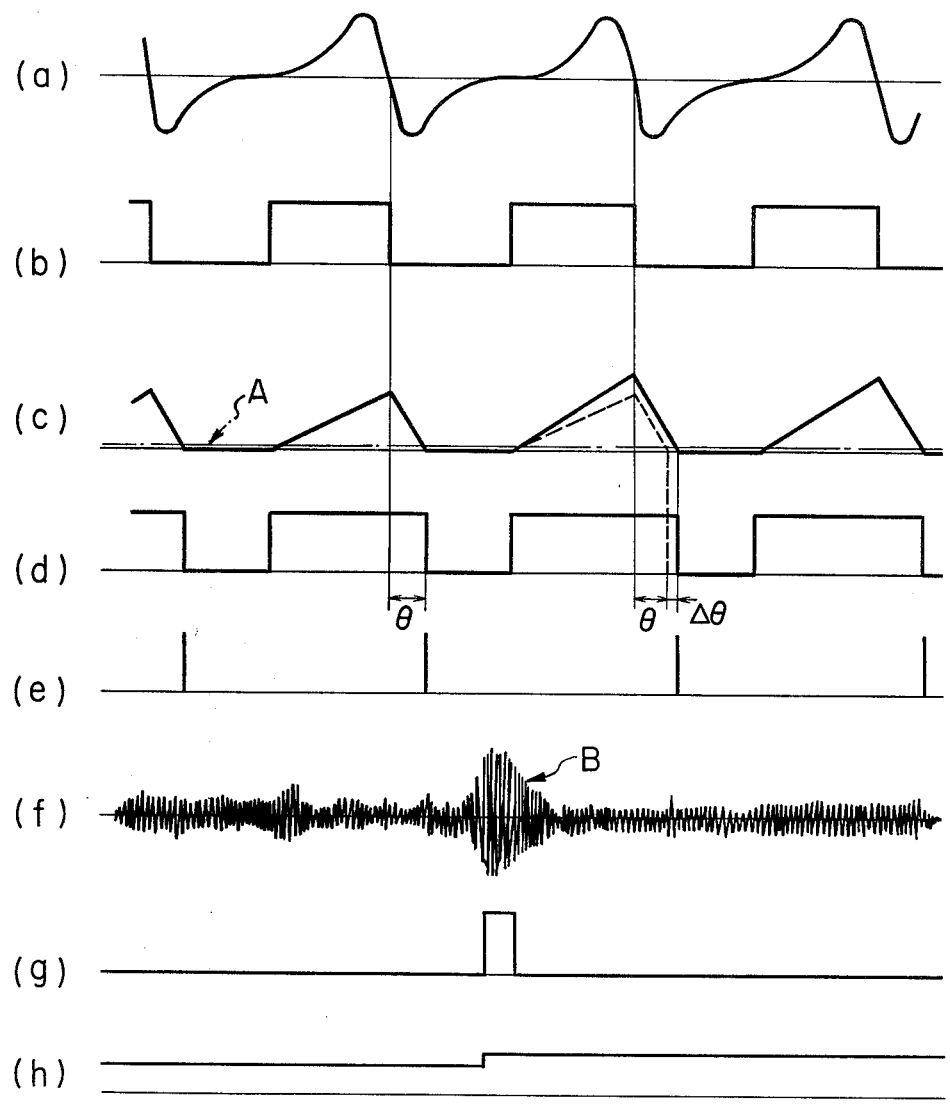

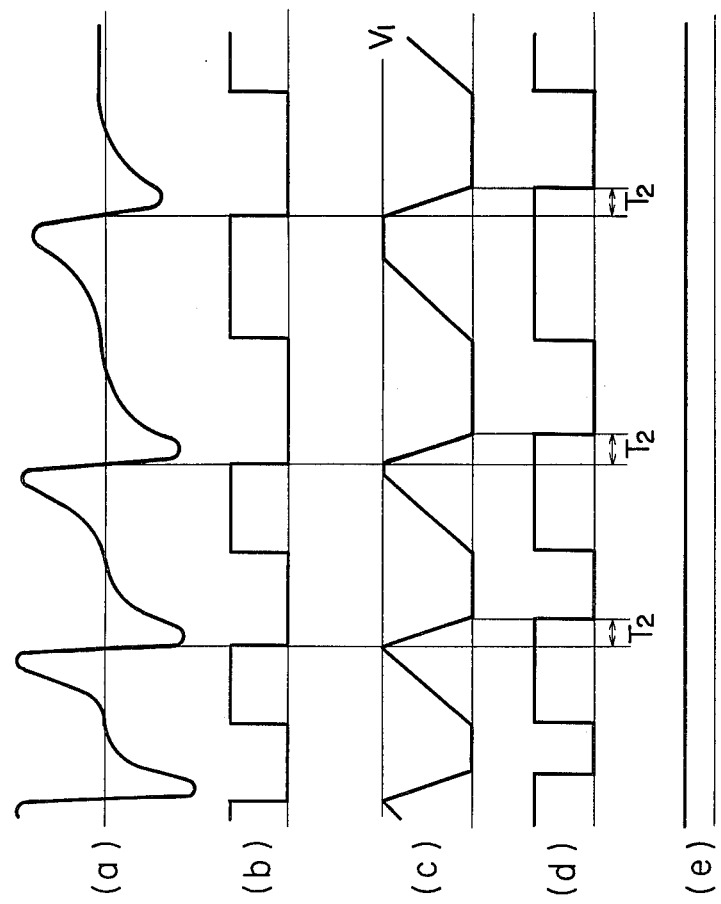
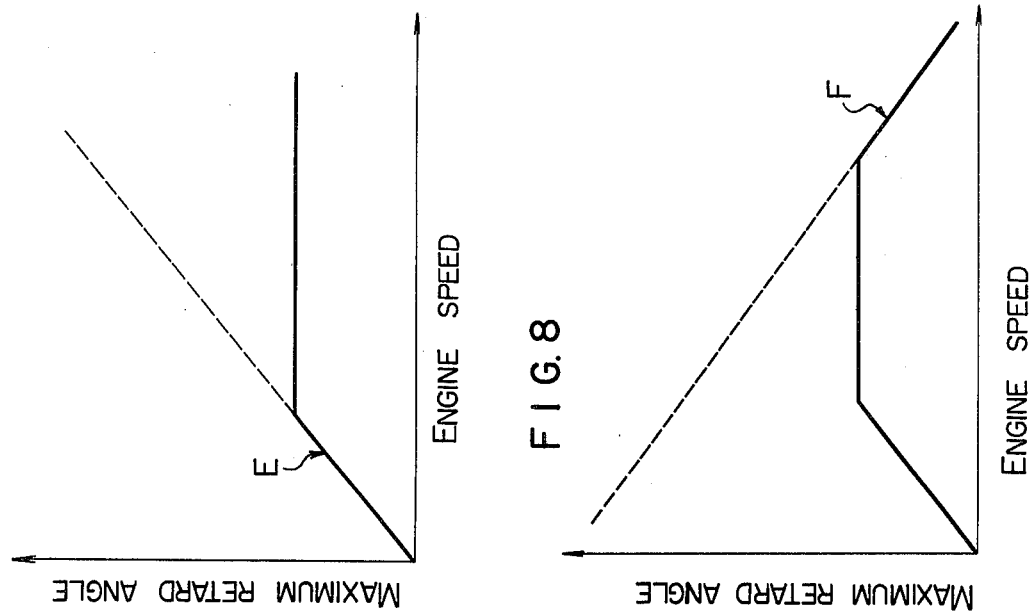

IGNITION TIMING CONTROL SYSTEM FOR INTERNAL COMBUSTION ENGINES

BACKGROUND OF THE INVENTION

1. Field of the Invention

The present invention relates to an ignition timing control system for internal combustion engines which is so designed that the occurrence of knocking in an engine is detected and the ignition timing is controlled in accordance with the result of the detection.

The ignition timing of the engine must be determined in accordance with the condition of the engine so as to ensure optimum operation of the engine.

2. Description of the Prior Art

The ignition timing control systems heretofore known have been generally so designed that the speed and intake vacuum of an engine are respectively detected by centrifugal and vacuum spark advance mechanisms so as to represent the condition of the engine and thereby to determine the ignition timing.

Generally, it has been considered that the best way from the standpoint of engine efficiency and fuel consumption is to effect the ignition at around the so-called point of minimum spark advance for best torque or MBT point and it has been necessary to vary the ignition timing to the MBT point in accordance with the engine conditions.

However, if the ignition timing is advanced under certain engine conditions, the engine will be caused to knock and thus the engine will be prevented from operating stably. Generally, the relation between MBT and the ignition timing at which knock occurs is such that the knocking limit is reached before MBT under low speed and low load operation of the engine. Also, the knocking limit tends to be affected by the atmospheric conditions such as the temperature, humidity, etc., and the known ignition timing control systems have been preliminarily programmed so that the ignition timing is maintained considerably later than MBT in accordance with the engine speed and intake vacuum parameters so as to prevent the occurrence of knock under all the engine operating conditions. As a result, the power output and fuel consumption of the engine are held lower than the engine performance.

To overcome these deficiencies and operate an engine under the best condition, a system has been proposed which is so designed that usually the ignition is effected in accordance with the ignition timing corresponding to the engine condition, and upon detection of knocking the ignition timing is controlled in accordance with the result of the detection so as to maintain a trace knocking condition and thereby to improve the power output and the fuel consumption.

FIG. 1 of the accompanying drawings is a diagram showing the control range of a known ignition timing control system of the knocking detecting type.

Referring to FIG. 1, in order to operate the engine under non-knocking or trace knocking conditions so as to improve the power output and fuel consumption of the engine, the control range must extend from the basic ignition timing (at A in the Figure) which provides the maximum power output and the best fuel consumption under non-knocking conditions and the threshold ignition timing (at B in the Figure) which allows only trace knocking under such operating conditions where the knocking tendency is greatest.

However, if the ignition timing is retarded to prevent the engine from knocking, there is the danger of causing difficulties. It is generally known that retardation of the ignition timing results in an increase in the temperature of the exhaust gas from the engine. In particular, if the ignition timing is retarded under the high speed operating conditions of the engine, there is the danger of the rising exhaust gas temperature eventually exceeding the range of allowable temperatures of the system incorporated in the engine.

On the other hand, since any trace knocking does not present any difficult problem to the engine, to retard the ignition timing greatly for the purpose of operating the engine under trace knocking conditions is not desirable in a sense that it results in a decrease in the power output.

SUMMARY OF THE INVENTION

It is an object of the present invention to provide an improved ignition timing control system so designed that in accordance with the occurrence of knocking the basic ignition timing is corrected to retard through the charging and discharging of an integrator circuit and the integrated current of the integrator circuit is varied in response to a voltage corresponding to the engine speed to limit the maximum amount of ignition timing retard under low speed operation or high speed operation of the engine, thus preventing, by means of a simple circuit construction, the danger of excessively retarding the ignition timing and decreasing the torque under low engine speed operation and preventing the exhaust gas temperature of the engine from rising beyond the allowable temperature limit of the system.

It is another object of the invention to provide such ignition timing control system so designed that during low speed operation of an engine, the occurrence of trace knocking which is harmless to the engine is allowed thus preventing any excessive retardation of the ignition timing and any decrease of the torque.

It is still another object of the invention to provide such ignition timing control system designed so that during high speed operation of an engine, the ignition timing is prevented from being retarded greatly thus preventing the engine exhaust gas temperature from rising beyond the allowable temperature limit of the system.

Preferred embodiments of the present invention will now be described in conjunction with the accompanying drawings.

BRIEF DESCRIPTION OF THE DRAWINGS

FIGS. 5 and 6 are timing charts useful for explaining the operation of the system according to the invention.

FIGS. 7 and 8 are diagrams showing the relation between the maximum amount of ignition timing retard and the engine speed according to the control of the invention.

DESCRIPTION OF THE PREFERRED EMBODIMENTS

The present invention will now be described in greater detail with reference to the illustrated embodiment.

Figure 1:
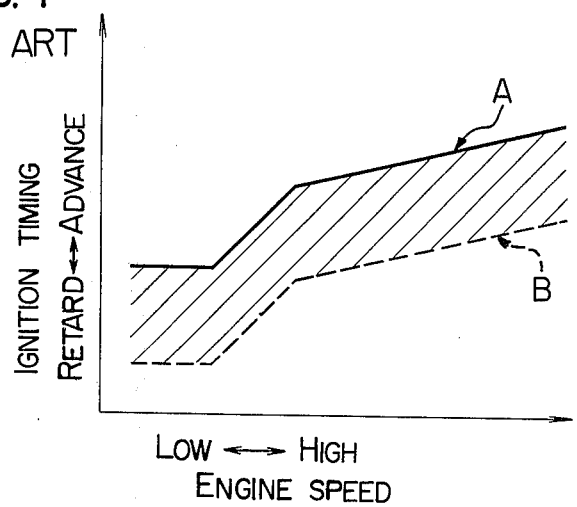
FIG. 1 is a diagram showing the control range of a prior art ignition timing control system of the knocking detecting type.
Figure 2:
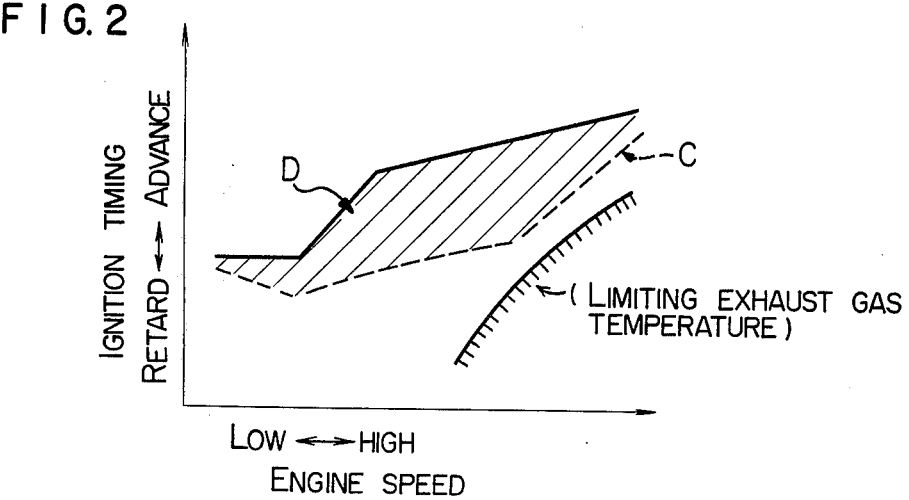
FIG. 2 is a diagram showing by way of example the control range of an ignition timing control system according to the invention.

FIG. 2 shows by way of example the control range of the ignition timing control system according to the present invention. In the Figure, the abscissa represents the engine speed and the ordinate represents the ignition timing. Reference symbol C indicates the maximum retard angle values, and C the range of ignition timing control according to the invention.

Figure 4:
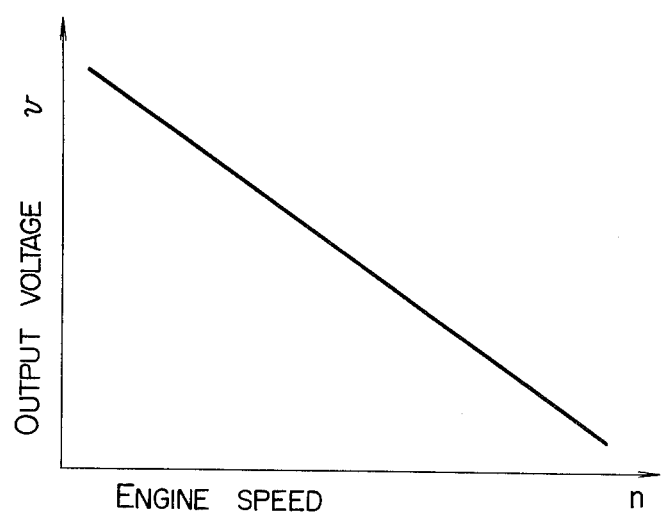
FIG. 4 is an output characteristic diagram of the function generator shown in FIG. 3.
Figure 3:
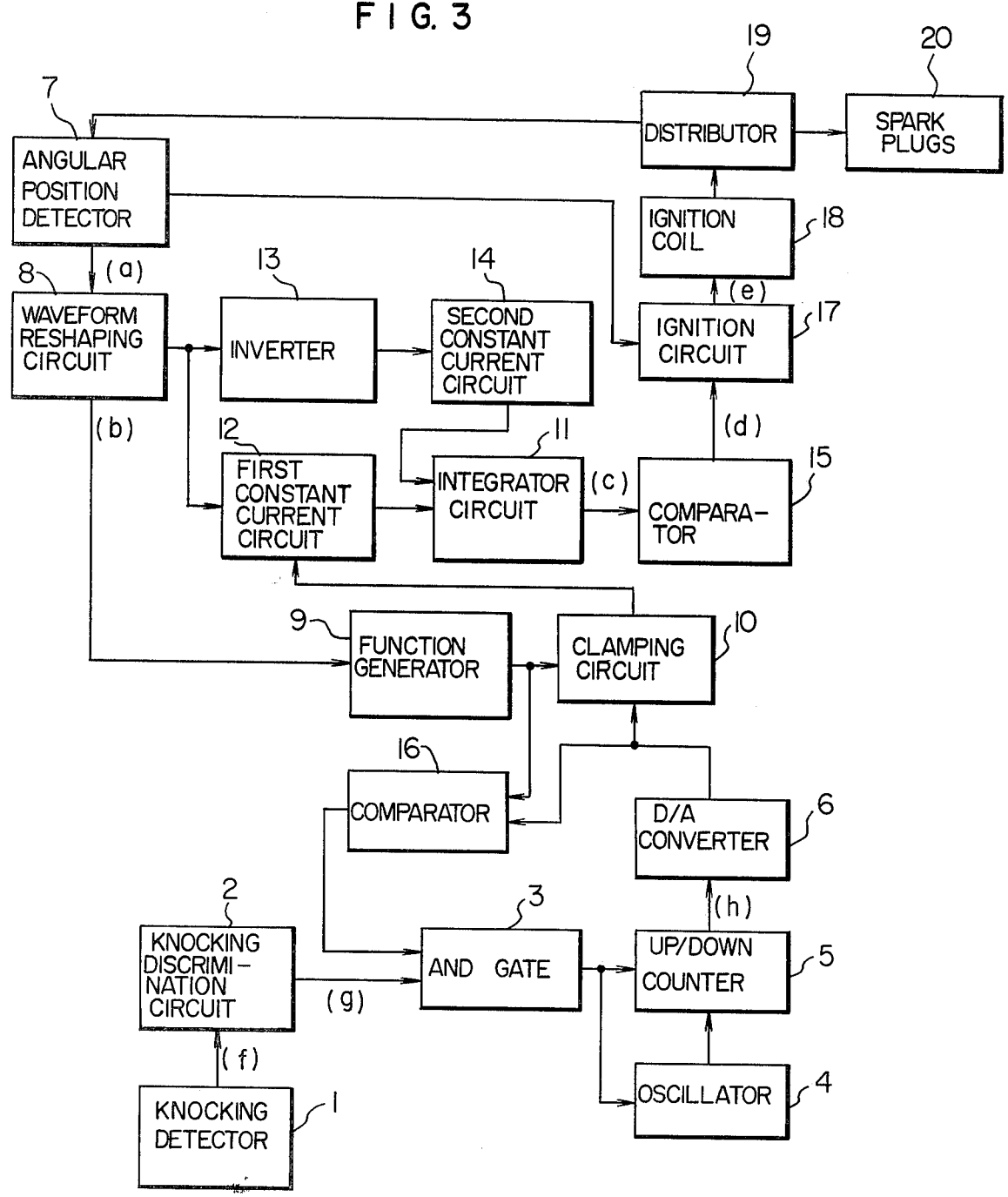
FIG. 3 is a block diagram showing the overall construction of an embodiment of the invention.

FIG. 3 is a block diagram showing the ignition timing control system for automobiles in accordance with the present invention, and FIG. 4 is an output characteristic diagram of the function generator shown in FIG. 3. In FIG. 3, numeral 1 designates a knocking detector whereby the cylinder pressure or vibration of an engine is converted to an electric signal and supplied to the following circuit, and 2 a knocking discrimination circuit responsive to the output signal of the knocking detector 1 to discriminate the presence of knocking and generate a rectangular pulse in response to every knocking event. The knocking detector 1 and the knocking discrimination circuit 2 form a knocking detecting circuit.

Numeral 3 designates an AND gate, 4 an oscillator which is reset when the output of the AND gate 3 goes to "1", 5 an up/down counter which receives the output of the oscillator 4 as clock pulses so that in synchronism with the clock pulses it counts up when the output of the AND gate 3 goes to "1" and it counts down when the output of the AND gate 3 goes to "0", and 6 a D/A converter for converting the digital output of the up/down counter 5 to an analog voltage. Numeral 7 designates an angular position detector comprising a known type of electromagnetic pickup mounted on the distributor shaft of the engine, and 8 a waveform reshaping circuit for reshaping the output of the angular position detector 7 to a rectangular waveform which goes to the "0" level in response to the basic ignition timing determined by the angular position detector 7 and which goes to the "1" level during the interval between the basic ignition points. The angular position detector 7 and the waveform reshaping circuit 8 form a speed sensor. Numeral 9 designates a function generator responsive to the output of the waveform reshaping circuit 8 forming a part of the speed sensor so as to generate an analog output having a characteristic as shown in FIG. 4 to decrease linearly with increase in the engine speed, 10 a clamping circuit for clamping the output of the D/A converter 6 to the output voltage of the function generator 9, and 16 a comparator for generating a "1" level signal when the output voltage of the function generator 9 is higher than the output voltage of the D/A converter 6. Numeral 11 designates an integrator circuit adapted to be saturated at a predetermined potential, 12 a first constant current circuit for supplying an amount of current proportional to the output voltage of the clamping circuit 10 to the integrator circuit 11 when the output of the waveform reshaping circuit 8 goes to "1", 13 an inverter, and 14 a second constant current circuit for discharing the integrator circuit 11 with a predetermined current when the output of the inverter 13 goes to "1" or the output of the waveform reshaping circuit 8 goes to "0". Numeral 15 designates a comparator for generating a "1" level signal when the output of the integrator circuit 11 exceeds a predetermined potential. The blocks 3 to 16 form an ignition timing control circuit.

Blocks 17 to 20 form an ignition system in which numeral 17 designates an ignition circuit for interrupting the current flow in an ignition coil 18 in response to the transition from "1" to "0" of the output of the comparator 15, and 19 a distributor whereby the high voltage generated from the ignition coil 18 is distributed to spark plugs 20 in the respective cylinders.

FIGS. 5 and 6 are time charts which are useful for explaining the operation of the system according to the invention. The basic operation of the system during the intermediate speed operation of the engine will be described first with reference to FIG. 5. In FIG. 5, (a) shows the output waveform of the angular position detector 7, and (b) the waveform of the signal reshaped by the waveform reshaping circuit 8. The "0" and "1" levels of the signal (b) are adjusted so as to always maintain the 1:1 relation therebetween in every ignition cycle. When the signal (b) goes to the "1" level, the first constant current circuit 12 charges the integrator circuit 11 with a current flow proportional to the value of the analog voltage produced by the D/A converter 6 from the output of the up/down counter 5. When the signal (b) goes to the "0" level, the second constant current circuit 14 discharges the integrator circuit 11 with a predetermined constant current at all times. The output waveform of the integrator circuit 11 becomes as shown in (c) of FIG. 5 and it is applied to the comparator 15 having a threshold level of about zero volt as shown at A in (c) of FIG. 5 to generate an output as shown in (d) of FIG. 5. The ignition is effected in response to the negative-going transition of the waveform (d) and the ignition signal is shown by the waveform in (e) of FIG. 5. The time at which the waveform (b) goes from "1" to "0" is predetermined by the centrifugal and vacuum advance units incorporated within the distributor 19 and it represents the basic ignition timing which provides the optimum power output, fuel consumption and exhaust characteristic under non-knocking operating conditions. The angle $\theta$ from the time of the basic ignition timing and the time of the negative-going transition of the waveform (d) is controlled in accordance with the detection of knocking. The output waveform of the knocking detector 1 is shown in (f) of FIG. 5 and the occurrence of knocking such as shown at B in (f) of FIG. 5 causes the knocking discrimination circuit 2 to generate a pulse as shown in (g) of FIG. 5. As soon as this pulse resets the oscillator 4, the up/down counter 5 starts counting up. Since the oscillator 4 oscillates at a predetermined period $T_1$, if no knocking occurs again after its resetting, the up/down counter 5 counts down at intervals of the time $T_1$. Since the integrator circuit 11 is charged during a predetermined angle with a current flow proportional to the output of the up/down counter 5 such as shown in (h) of FIG. 5 and it is discharged with the predetermined current, the retard angle $\theta$ is proportional to the output of the up/down counter 5. In other words, when knocking occurs, the ignition timing is retarded by a predetermined angle $\Delta\theta$ per knocking event. If there is no occurrence of knocking, the ignition timing is advanced by the angle $\Delta\theta$ at intervals of the time $T_1$ with the basic ignition timing is attained.

In this case, the integrator circuit 11 is designed so as to be saturated at a predetermined voltage $V_1$ and consequently it is impossible to retard the ignition timing beyond the basic ignition timing in excess of a certain time $T_2$ as shown in (d) of FIG. 6. When the engine comes into a low speed operation, even if the output of the D/A converter 6 is constant as shown in (e) of FIG. 6, the ignition timing is controlled so as to be retarded in terms of a fixed time instead of the predetermined angle. This is evident from the output voltage waveform of the integrator circuit 11 shown in (c) of FIG. 6.

FIG. 7 is a graph showing the relation between the engine speed and the maximum retard angle under low speed operating conditions of the engine, and FIG. 8 is a graph showing the relation between the engine speed and the maximum retard angle under high speed operating conditions of the engine.

It will be seen from the foregoing description that the maximum amount of ignition retard angle is limited as shown at E in FIG. 7 under the low speed operating conditions of the engine. The waveforms shown in (a) and (b) of FIG. 6 are the same with those shown in (a) and (b) of FIG. 5.

On the other hand, during high speed operation of the engine the output of the D/A converter 6 is clamped in accordance with the characteristic of the function generator 9 shown in FIG. 4 and the maximum retard angle of the ignition timing is limited as shown at F in FIG. 8. As a result, the AND gate 3 is closed so that the up/down counter 5 counts up no longer and the clamping voltage and the output of the up/down counter 5 become equal to each other.

By virtue of the operation described above, the ignition timing control system for automobiles in accordance with the invention provides an ignition timing control range as shown at D in FIG. 2.

It will thus be seen from the foregoing description that in accordance with the present invention, in response to the occurrence of knocking the basic ignition timing is controlled in a direction to retard it through the charging and discharging of the integrator circuit and the integrated current of the integrator circuit is varied by a voltage corresponding to the speed of the engine to limit the maximum retard angle from the basic ignition timing under low speed or high speed operating conditions of the engine, thus ensuring the following advantages.

(a) During low speed operation of the engine, the occurrence of trace knocking at low engine speeds which is not detrimental to the engine is allowed to prevent any excessively large retardation of the ignition timing and thereby to prevent any decrease of the torque.

(b) During high speed operation of the engine, the ignition timing is prevented from being retarded excessively and the engine exhaust gas temperature is prevented from rising in excess of the allowable temperature limit of the system.

(c) The above-mentioned effects can be attained with a very simple circuit construction.

We claim:

1. In an ignition timing control system, for internal combustion engines comprising knocking detecting means for detecting the occurrence of knocking in said engine, a knocking discrimination circuit responsive to an output signal of said knocking detecting means to determine the occurrence of knocking and generate a rectangular pulse in response to each knocking event, an ignition timing control circuit responsive to the occurrence of said knocking to adjust a basic ignition timing established in accordance with an operating condition of said engine, and ignition means responsive to an output signal of said ignition timing control circuit to effect ignition of said engine, the improvement wherein said ignition timing control circuit comprises:

speed sensor means for detecting a speed of said engine, and generating an engine speed signal, a pair of constant current circuits operated by a signal from said speed sensor means, an integrator circuit whose charge and discharge are controlled by said pair of constant current circuits, means for outputting a voltage corresponding to the output signal of said knocking detecting means, said outputting means controlling the output current of one of said constant current circuits according to the knocking state, and means for limiting the output current of one of said constant current circuits by limiting the output voltage of said outputting means according to a signal from said speed sensor means.

2. An ignition timing control system according to claim 1, wherein said integrator circuit saturates at a predetermined charge level, and so that a maximum amount of ignition timing retard is then established by said ignition timing control circuit.

3. An ignition timing control system according to claim 1, wherein said speed sensor means comprises angular position sensing means including an electromagnetic pickup attached to said engine, and a waveform reshaping circuit for reshaping an output of said angular position sensing means to a rectangular waveform.

4. An ignition timing control system according to claim 1, wherein said ignition timing control circuit further includes a function generator responsive to an output of said speed sensor means to generate an analog output having a characteristic such that said analog voltage decreases linearly with increase in the speed of said engine.

* * * * *